(No Model.) 2 Sheets—Sheet 1.

S. L. HEYWOOD.
VARIABLE DIRECTION AND SPEED DEVICE.

No. 530,588. Patented Dec. 11, 1894.

Witnesses:
C. E. Van Dorn.
W. E. Gooley.

Inventor:
Silas L. Heywood
By Paul O'Rawley
his Attorneys.

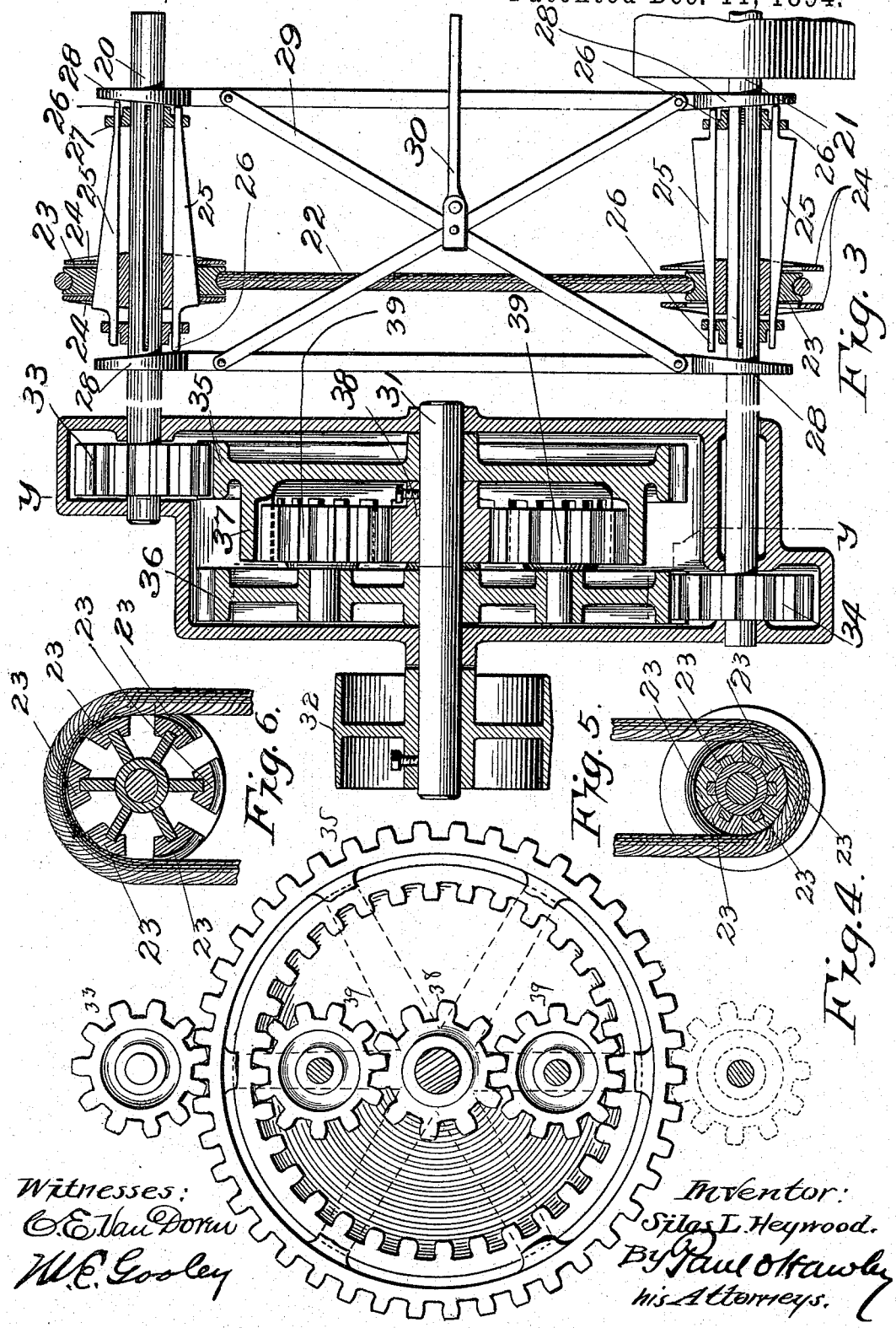

UNITED STATES PATENT OFFICE.

SILAS L. HEYWOOD, OF MINNEAPOLIS, MINNESOTA.

VARIABLE DIRECTION AND SPEED DEVICE.

SPECIFICATION forming part of Letters Patent No. 530,588, dated December 11, 1894.

Application filed June 1, 1894. Serial No. 513,120. (No model.)

*To all whom it may concern:*

Be it known that I, SILAS L. HEYWOOD, of the city of Minneapolis, county of Hennepin, State of Minnesota, have invented certain new and useful Improvements in Variable Direction and Speed Devices, of which the following is a specification.

My invention relates to a variable speed device, and furthermore to a device in which the direction of movement may be reversed at will.

The object of my invention is to provide means whereby any given power or speed, or direction of movement within a certain maximum may be obtained as a resultant from two driven shafts.

A further object is to render such means as simple and as compact and easy of operation as possible.

A further object is to so construct the devices that they may be employed for different uses, one form being adapted for employment in places where small power is needed and the other for heavy work.

My invention consists in general in a variable direction and speed device of the construction and combination of parts all as hereinafter described and particularly pointed out in the claims.

The invention will be more readily understood by reference to the accompanying drawings, forming part of this specification, and in which—

Figure 1:
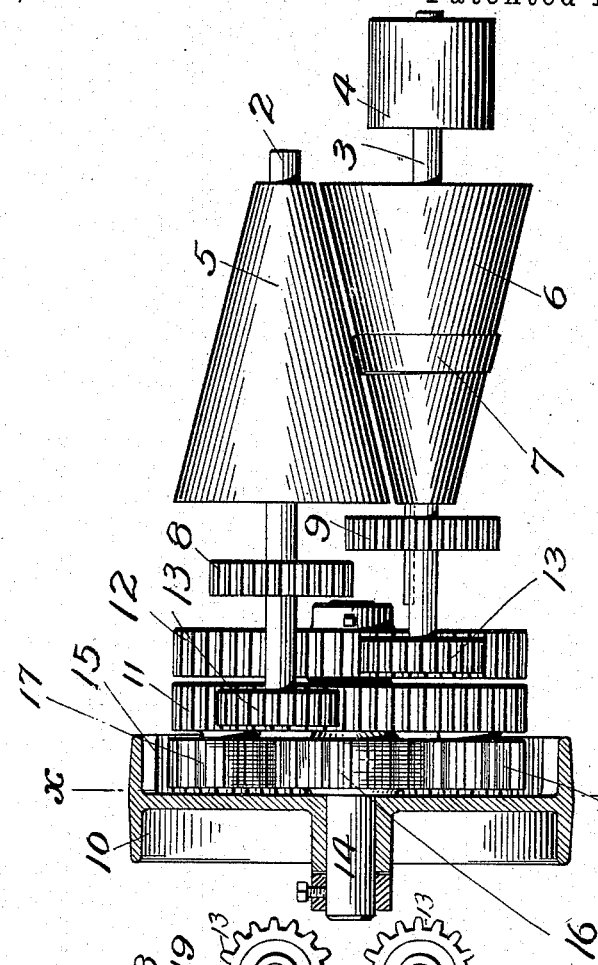
Figure 2:
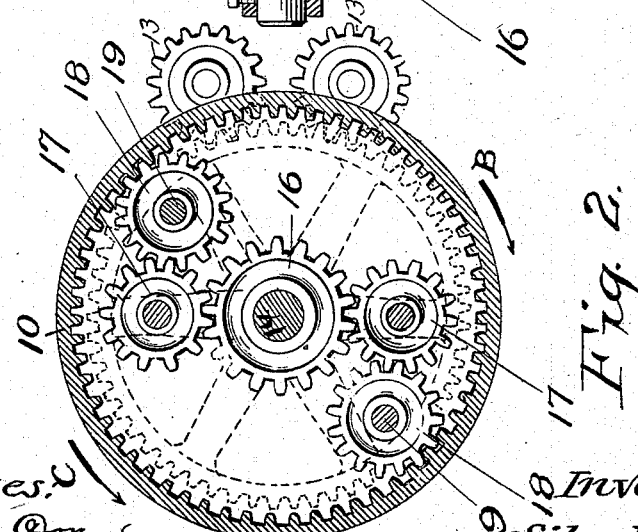

Figure 1 is a plan view of a device embodying my invention, the driven pulley or drum being shown in section. Fig. 2 is an end view thereof on the line $x$—$x$ of Fig. 1. Fig. 3 is a sectional plan view showing a modified form of my device. Fig. 4 is a sectional view on the line $y$—$y$ of Fig. 3. Figs. 5 and 6 are transverse sectional views of the expanding pulleys employed on drividing shafts.

In Figs. 1 and 2, 2 and 3 represent the driving shafts, the drive pulley 4 being mounted upon one of the same, and oppositely arranged cone pulleys 5 and 6 being provided on the shafts. A connecting belt 7 is arranged to run between the cones and when shifted from point to point thereon will vary the ratio of speeds between the shafts 2 and 3. These cone pulleys may if desired be replaced by gears 8 and 9 provided on said shafts, the gear 9 being somewhat larger than the other to the end that a slow rotation may be obtained on the driven drum 10 with a proportionately large power. 11 and 12 represent large gear wheels with which pinions 13 on the shafts 2 and 3 engage, respectively. The gear wheel 11 is loosely journaled on the driven shaft 14. The drum 10 is also loosely journaled thereon, while the gear wheel 12 is fixed upon said shaft to rotate therewith. The drum is preferably provided with the internal gear 15, and within this is a smaller gear wheel 16 secured on the shaft 14. The internal gear 15 and this gear 16 are connected by one or more pairs of pinions or idlers 17—18, the pinion 17 meshing with the gear 16, while the pinion 18 meshes with the teeth of the internal gear 15. Both pinions or idlers are carried upon stud shafts 19 which extend from the side of the gear wheel 11.

In Figs. 3, 5 and 6 I have shown expanding pulleys connected by a belt and to be used instead of the cone pulleys illustrated in Fig. 1. The two shafts 20 and 21 in Fig. 3 are similar to those numbered 2 and 3 (Figs. 1 and 2) except that as they are connected by a straight belt 22 they revolve in the same direction. The belt 22 passes around the pulleys, which are each formed of a number of segment blocks 23 retained between disks 24 and resting upon the longitudinally movable wedges 25. These wedges project through slots provided in the said disks 24 and as the wedges are forced in or out the pulleys are expanded or contracted in diameter. The ends of the wedges are provided with ends or extensions 26, extending through holes in the rings or collars 27, which like the disks 24 are fixed to the shaft, though, unlike the same, they are longitudinally movable on the shaft. The ends of the wedges are arranged to be engaged by the longitudinally movable inclined disks 28, slidable on the shaft and four in number, two being provided for each pulley. The inclined disks tilt in opposite directions on opposite sides of the pulley and the four disks are connected by the frame 29 to which a suitable shipper rod 30 is attached, and by means of which the disks may be moved forward or back on the shafts to be engaged by the rotating wedges which are gradually moved thereby, one pulley being expanded while the other is permitted to contract. It will be noted that in this driving of the wedges the power is exerted thereon while the wedges are acting upon the blocks on the under sides of the pulley, or, in other words, out of engagement with the belt. The variable motion of the two shafts 20 and 21 is communicated to the third shaft 31 through a series of gears, whereby any desired speed up to the maximum may be obtained on the shaft 31 and the driven pulley 32 thereon and the same driven in either direction. Pinions 33 and 34 are provided on the shafts 20 and 21, respectively, and these engage with the gear wheels 35 and 36 respectively. Both of these gears are loosely journaled upon the shaft 31, and the gear wheel 35 is provided with a flange 37 provided with teeth and constituting an internal gear wheel. Between the two gear wheels I provide a smaller gear wheel 38 secured upon the shaft 31 and in the plane of the internal gear. The gear wheel 36 carries one or two pinions 39 which mesh with the inner gear wheel and with the inside gear 37, whereby the resultant movement and force of the two gear wheels are communicated to the gear 38 and the shaft 31.

The results obtained by the use of my mechanism may be detailed as follows: Owing to the employment of the cone pulleys, or, in place thereof, of the gear wheels 8 and 9 of the shafts 2 and 3, said shafts will be driven in opposite directions and at the speeds desired. For the purpose of explanation, assume that the shaft 3 is stationary, while the shaft 2 is revolving at full speed. In that case the inner gear wheel 16 (Figs. 1 and 2) will be stationary, while the pinions 17 and 18 will be rapidly rolling around the same. Their own rotative travel will be limited to the circumference of the inner gear wheel 16, which is less than that of the internal gear, and as a consequence the drum 10 will be partially locked on the pinions and will be carried around thereby, its speed being in the proportion of its own circumference less that of the gear 16. The movement will be in the direction of the gear 11 as indicated by the arrow B Fig. 2. On the other hand, suppose the other shaft to be stationary and the shaft 3 to be revolving at full speed, carrying with it the gear 12 and the inner gear 16. In that case the wheel 11 supporting pinions will be stationary but the pinions will be driven on their shafts 19 by the gear 16, and thereby will drive the drum 10 at the maximum speed and in the opposite direction, as indicated by arrow c, Fig. 2. Again, suppose the shaft 3 to be rotating at a somewhat slower speed than the shaft 2, which would be the case with the parts in the positions shown in Fig. 1 or with the gear wheel 9 in mesh with the gear 8. Then the pinions and the gear 16 would revolve in opposite directions, the result being that the pinions would gain somewhat on the gear 16 and would consequently draw the drum around slowly in the direction of the arrow B. If the ratio of speed should be in favor of the inner gear 16, then the drum would be driven slowly in the direction of the arrow c.

It is obvious that the ratio of speed between the shafts 2 and 3 may be regulated to obtain the desired direction on the drum 10 and also the desired speed; and it is further obvious that if the shafts 2 and 3 were rotated at the same speed then the drum would remain stationary, that is, assuming the gear 16 to be one half the diameter of the internal gear on the drum. By this mechanism slow speeds may be obtained and great power transmitted.

For lighter work I prefer to employ that form of my device shown in Figs. 3 and 4, obtaining lighter power and higher speeds thereby. Owing to the direct belt connection between the shafts 20 and 21 said shafts will rotate in the same direction and consequently the gears 35 and 36 will rotate together but at speeds varying with the speeds of the shafts 20 and 21.

The gear wheel 36 carrying the two pinions, as it gains or loses over the speed of the gear 35 which carries the internal gear, serves to operate the shaft 31 in the reverse or the same direction, alternatively. Stopping the shaft 21 will stop the gear 36 and will cause the shaft 31 to rotate at a maximum speed, while stopping the shaft 20 and gear 35 while the gear 36 is in rotation will drive the shaft at one fourth the maximum speed in the other direction. Furthermore, as the motion is transmitted from the large internal gear to the small inner gear 38, the speed of the shaft will be greater than the speed of the gears 35 and 36. By rotating the gears 36 and 37 at speeds in the proportion of one to four the shaft may be made to stand still.

Having thus described my invention, I claim as new and desire to secure by Letters Patent—

1. The combination, with two driving shafts, of a third driven shaft, and a planetary gear connecting said shafts with the third shaft, whereby said third shaft may be driven in either direction and at a variable speed, substantially as described.

2. The combination, with the two driving shafts, of a planetary gear connecting the same, and a third shaft forming a part of said gear, and means for driving the two shafts first mentioned at various speeds, whereby a variable speed and direction of movement is obtained on said third shaft, substantially as described.

3. The combination, in the variable direction and speed device, of two large gears, one connected with the inside or internal gear, means for driving said gears at variable speeds, a shaft concentric with said gears, a smaller inner gear wheel provided thereon, and a pinion carried by the other large gear and connecting the internal gear and said inner gear, substantially as described.

4. The combination, with the two driving shafts, of a third shaft, the system of gears connecting said shafts with the third shaft, the disks provided upon the first two shafts, the movable segment blocks arranged within said disks, the belt running over the pulleys made by said blocks, the wedges for operating the blocks, the wedges belonging to the two pulleys being oppositely arranged, and the shifting frame for moving the wedges, substantially as described.

5. The combination, with the two driving shafts, of means for driving the same at variable speeds and in the same direction, the third shaft, the two large gear wheels journaled thereon, pinions upon the first shafts engaging the said large gears respectively, a smaller inner gear wheel fixed upon said shaft, the pulley also fixed thereon, one of said large gear wheels provided with an internal gear in the plane of said smaller gear, and a pinion or pinions carried upon the side of the other gear, and extending between and meshing with said smaller or inner gear and said internal gear respectively, substantially as described.

In testimony whereof I have hereunto set my hand this 22d day of May, A. D. 1894.

SILAS L. HEYWOOD.

In presence of—
C. G. HAWLEY,
M. E. GOOLEY.